United States Patent
Chant et al.

(10) Patent No.: US 10,257,164 B2
(45) Date of Patent: Apr. 9, 2019

(54) CLASSIFYING E-MAIL CONNECTIONS FOR POLICY ENFORCEMENT

(75) Inventors: Matthew P. Chant, Brockton, MA (US); Peter K. Lyons, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 3391 days.

(21) Appl. No.: 10/789,574

(22) Filed: Feb. 27, 2004

(65) Prior Publication Data
US 2005/0193072 A1    Sep. 1, 2005

(51) Int. Cl.
| G06F 15/16 | (2006.01) |
|---|---|
| H04L 29/06 | (2006.01) |
| H04L 12/58 | (2006.01) |
| G06Q 10/10 | (2012.01) |
| G06F 17/30 | (2006.01) |

(52) U.S. Cl.
CPC ......... H04L 63/0236 (2013.01); H04L 51/12 (2013.01); *G06F 17/30867* (2013.01); *G06Q 10/10* (2013.01); *G06Q 10/107* (2013.01); *H04L 51/14* (2013.01); *H04L 51/22* (2013.01); *H04L 63/0227* (2013.01); *H04L 63/10* (2013.01)

(58) Field of Classification Search
CPC ... H04L 12/585; H04L 51/12; H04L 63/0236; H04L 51/22; H04L 51/14; H04L 63/0227; H04L 63/10; G06Q 10/00; G06Q 10/107; G06Q 10/10; G06F 17/30867

USPC ............ 709/206, 224, 225, 207; 379/88.23; 715/500; 726/23, 14
See application file for complete search history.

(56) References Cited

U.S. PATENT DOCUMENTS

| 6,453,327 | B1 * | 9/2002 | Nielsen ......................... 715/500 |
|---|---|---|---|
| 7,127,741 | B2 * | 10/2006 | Bandini ................. G06Q 10/00 726/14 |
| 7,149,778 | B1 * | 12/2006 | Patel et al. .................... 709/206 |
| 7,200,637 | B2 * | 4/2007 | Klos et al. ..................... 709/206 |
| 7,206,814 | B2 * | 4/2007 | Kirsch ..................... H04L 51/12 709/206 |
| 7,219,148 | B2 * | 5/2007 | Rounthwaite et al. ........ 709/224 |
| 7,224,778 | B2 * | 5/2007 | Aoki .......................... 379/88.23 |
| 7,882,193 | B1 * | 2/2011 | Aronson et al. .............. 709/207 |
| 2002/0116463 | A1 * | 8/2002 | Hart ............................. 709/206 |
| 2003/0131063 | A1 * | 7/2003 | Breck ..................... H04L 51/12 709/206 |

(Continued)

*Primary Examiner* — Jungwon Chang
(74) *Attorney, Agent, or Firm* — Steven M. Greenberg, Esq.; Shutts & Bowen LLP

(57) ABSTRACT

A method and system for the policy-based restriction of electronic mail transmissions. A method for classifying electronic mail message transfer requests for policy enforcement can include identifying a source of an incoming electronic message, classifying the source, and applying a message transfer policy associated with the classification for the source. In particular, the identifying step can include identifying a network address for the source. The classifying step by comparison, can include classifying the source as one of a trusted source, a blocked source, and a suspect source. The classifying step also can include classifying the source as one of an authenticated source and an anonymous source. Finally, the classifying step further can include classifying the source as a blocked source where the source appears in a realtime black hole list.

11 Claims, 2 Drawing Sheets

(56) References Cited

U.S. PATENT DOCUMENTS

| | | | |
|---|---|---|---|
| 2003/0204569 A1* | 10/2003 | Andrews | H04L 51/12 |
| | | | 709/206 |
| 2003/0236845 A1* | 12/2003 | Pitsos | 709/206 |
| 2005/0080642 A1* | 4/2005 | Daniell | G06Q 10/107 |
| | | | 709/206 |
| 2005/0102366 A1* | 5/2005 | Kirsch | 709/207 |
| 2005/0188023 A1* | 8/2005 | Doan | G06Q 10/107 |
| | | | 709/206 |
| 2006/0031303 A1* | 2/2006 | Pang | G06Q 10/107 |
| | | | 709/206 |
| 2006/0265498 A1* | 11/2006 | Turgeman et al. | 709/225 |

* cited by examiner

CLASSIFYING E-MAIL CONNECTIONS FOR POLICY ENFORCEMENT

BACKGROUND OF THE INVENTION

Statement of the Technical Field

The present invention relates to the processing electronic mail and more particularly to limiting the transmission of electronic mail based upon the identity of the transmission source.

Description of the Related Art

Historically, the print medium served as the principal mode of unsolicited mass advertising on the part of the direct marketing industry. Typically referred to as "junk mail", unsolicited print marketing materials could be delivered in bulk to a vast selection of recipients, regardless of whether the recipients requested the marketing materials. With an average response rate of one to two percent, junk mail has been an effective tool in the generation of new sales leads. Nevertheless, recipients of junk mail generally find the practice to be annoying. Additionally, postage for sending junk mail can be expensive for significant "mail drops". Consequently, the direct marketing industry constantly seeks equally effective, but less expensive modalities for delivering unsolicited marketing materials.

The advent of electronic mail has provided much needed relief for direct marketers, as the delivery of electronic mail to a vast number of targeted recipients requires no postage. Moreover, the delivery of unsolicited electronic mail can be an instantaneous exercise and the unsolicited electronic mail can include embedded hyperlinks to product or service information thus facilitating an enhanced response rate for the "mail drop". Still, as is the case in the realm of print media, unsolicited electronic mail remains an annoyance to consumers worldwide.

The term "spam" has been assigned to unsolicited commercial electronic mail. For many, spam represents a scourge upon the Internet consuming unnecessary bandwidth, excess computing resources and the time of millions of Internet users. Ironically, while electronic mail in the past has been viewed as the "killer" application designed to provide vast efficiencies in the field of global communications, spam threatens to minimize the effectiveness of electronic mail by imposing upon electronic mail users the obligation of screening incoming messages to detect spam. Consequently, many avoid the use of electronic mail simply to avoid spam.

Several techniques have been developed to combat the spread of spam. Spam filters have been disclosed in which textual patterns within electronic mail can be correlated to known patterns associated with spam. Where an electronic message includes text matching a known spam pattern, the delivery of the electronic message can be suppressed. By comparison, many convention electronic mail clients include functionality for identifying a message as spam. Upon identifying a message as spam, the domain of the sender can be associated with spam such that subsequent messages transmitted from the domain of the sender can be suppressed as spam.

Nevertheless, the skilled artisan will recognize that each of the foregoing spam combating techniques can be characterized at best as client-side application layer techniques. In this regard, so long as the number and nature of individual electronic mail clients vary, so too will the effectiveness of the spam combating techniques. Similarly, electronic mail filtering applications can differ widely and, again, depending upon the implementation, the effectiveness can vary as well. Notably, all electronic mail clients exchange information at the protocol layer using a universally adopted mail protocol—the simple mail transfer protocol (SMTP). Accordingly, what is needed is a more effective methodology for combating spam exclusive of the client side mail client which can span varying mail clients while maintaining a constant level of effectiveness.

SUMMARY OF THE INVENTION

The present invention addresses the deficiencies of the art in respect to unsolicited commercial electronic mail and provides a novel and non-obvious method, system and apparatus for the policy-based restriction of electronic mail transmissions. A method for classifying electronic mail message transfer requests for policy enforcement can include identifying a source of an incoming electronic message, classifying the source, and applying a message transfer policy associated with the classification for the source.

In particular, the identifying step can include identifying a network address for the source. The classifying step by comparison, can include classifying the source as one of a trusted source, a blocked source, and a suspect source. The classifying step also can include classifying the source as one of an authenticated source and an anonymous source. Finally, the classifying step further can include classifying the source as a blocked source where the source appears in a realtime black hole list. Alternatively, the classifying step further can include classifying the source as a suspect source where the source appears in a realtime black hole list. In any case, the source can be classified as an authenticated source only where an authenticated connection has been established with the source.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for classifying and processing process incoming electronic mail messages based upon associated policies. In accordance with the present invention, prior to delivering an electronic message to a mail client, the incoming electronic message can be classified based upon the source of the incoming message. A policy associated with the classification can be used to determine how to process the incoming message. For instance, at one extreme a policy can indicate that all messages associated with a trusted classification are to be delivered, while at another extreme, a policy can indicate that all messages associated with a blocked classification are never to be delivered. In this way, spam can be intelligently handled uniformly and automatically without regard to the varying nature of disparate electronic mail clients.

Figure 1:
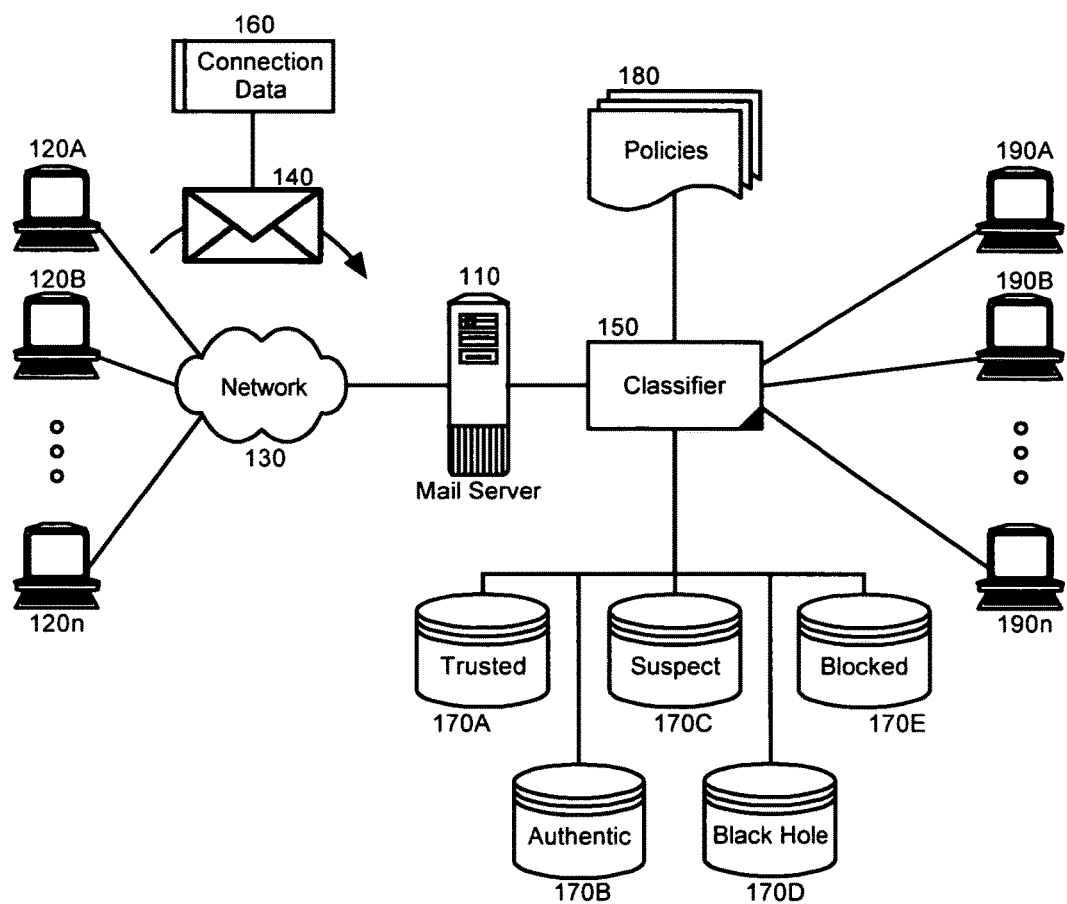
FIG. 1 is a schematic illustration of a mail processing system configured to classify and process incoming electronic mail messages based upon associated policies; and, FIG. 2 is a flow chart illustrating a process for classifying and processing process incoming electronic mail messages based upon associated policies.

In further illustration, FIG. 1 is a schematic diagram of a mail processing system configured to classify and process incoming electronic mail messages based upon associated policies. The system can include a mail server 110 coupled to one or more sources of electronic messages 120A, 120B, 120n over a computer communications network 130, for instance the global Internet. The mail server 110 can be configured to receive messages 140 from the sources 120A, 120B, 120n which have been addressed to one or more message recipients 190A, 190B, 190n, also coupled to the mail server 110. Notably, in a preferred aspect of the invention the mail server 110 can be configured to process electronic messages according to SMTP.

Importantly, a classification processor 150 can be coupled to or included as part of the mail server 110. The classification processor 150 can be programmed to inspect all or part of the connection data 160 associated with an electronic message 140 in order to classify the source 120A, 120B, 120n of the electronic message 140. To assist in the classification process, the classification processor 150 can be coupled to classification tables 170A, 170B, 170C, 170D, 170E each of which can include a listing of message sources 120A, 120B, 120n. For example, the trusted table 170A can include a listing of those sources 120A, 120B, 120n which are trusted, while the blocked table 170E can include a listing of those sources 120A, 120B, 120n which are to be blocked from sending electronic messages to the recipients 190A, 190B, 190n.

In accordance with the present invention, a set of policies 180 can be associated with the classifications applicable to the sources 120A, 120B, 120n. In this regard, the classification processor 150 can classify the source of an incoming message 140 based upon the connection data 160, for example the network address, a portion of the network address, or some such other identifying information included in or in association with the message 140. Based upon the classification of the message 140, a selected one of the policies 180 can be applied which can specify a course of action for limiting or permitting the transfer of the message to an intended one of the recipients 190A, 190B, 190C.

Figure 2:
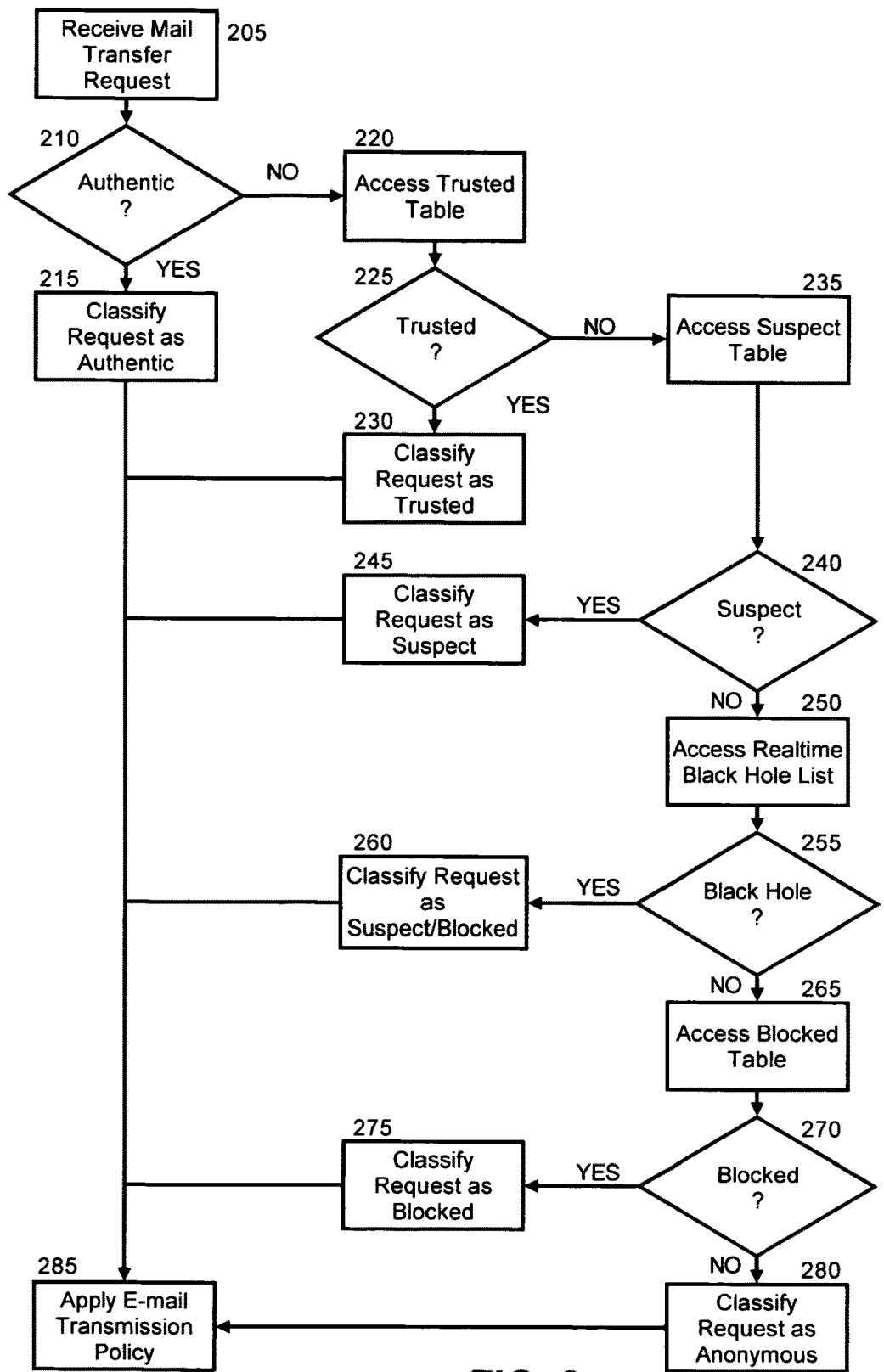

In more particular illustration, FIG. 2 is a flow chart showing a process for classifying and processing process incoming electronic mail messages based upon associated policies. Beginning in block 205, a message transfer request can be received. In decision block 210, it can be determined whether the request is to be authenticated. For example, in SMTP, one of a plain text or encoded authentication process can be undertaken prior to transferring a message into the mail server. In block 215, if the connection has been authenticated, the request can be classified as "Authenticated". Otherwise, the process can continue in block 220.

In block 220, the table of trusted sources can be accessed to determine in decision block 225 whether the source of the message transfer request has been included in the table of trusted sources. If so, in block 230 the source of the message transfer request can be classified as "trusted". Otherwise the process can continue in block 235. In block 235, a table of suspect sources can be accessed. As before, in decision block 240 it can be determined whether the source of the message transfer request has been included in the table of suspect sources. If so, in block 245 the source of the message transfer request can be classified as "suspect". Otherwise, the process can continue in block 250.

In block 250, a realtime black hole list can be accessed to determine in decision block 255 whether the source of the message transfer request has been included in the realtime black hole list. If so, in block 260 the source of the message transfer request can be classified as "suspect". In an alternative embodiment, the source of the transfer request can be classified as "blocked". Otherwise the process can continue in block 265. In block 265, a table of blocked sources can be accessed. As before, in decision block 270 it can be determined whether the source of the message transfer request has been included in the table of blocked sources. If so, in block 275 the source of the message transfer request can be classified as "blocked". Otherwise, in block 280 the source of the message transfer request can be classified as "anonymous".

Notably, in all cases, in block 285 a policy can be applied to the message transfer request based upon the classification of the message request source. For instance, where the source of the message transfer request has been classified as trusted or authenticated, the message transfer request can be satisfied without objection. In contrast, where the source of the message transfer request has been classified as blocked, the message transfer request can be quashed. Finally, where the source of the message transfer request has been classified as suspect or anonymous, the message transfer request can be handled such that the ability of the source to transmit messages to intended recipients can be limited. In any case, the policies can define message transmission decisions aimed at curbing the transmission of spam without undermining the effectiveness of the electronic mail medium.

The present invention can be realized in hardware, software, or a combination of hardware and software. For example, the data handling policy can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. For example, the data handling policy can be stored in a database.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for classifying electronic mail message transfer requests for policy enforcement comprising the steps of:
    establishing a set of different message transfer policies, each policy having an association with a different classification of a source of an incoming electronic message;
    identifying a source of an incoming electronic message included as part of a message transfer request;
    classifying said source as one of a trusted source on condition that the source is located in a table of trusted sources, a suspect source where the source has an IP address that appears in a realtime black hole list on condition that the source is located in a table of suspect sources, a blocked source on condition that the source is present in a table of blocked sources, or an anonymous source on condition that the source is not present in any of the tables;
    subsequently selecting a message transfer policy from amongst the set based upon the classification, the policy permitting full satisfaction of the request for a source classified as a trusted source, the policy prohibiting satisfaction of the request for a source classified as blocked and the policy permitting only limited satisfaction of the request for a source classified either as a suspect source or an anonymous source; and,
    applying the selected message transfer policy to said incoming electronic message so as to curb transmission of spam without undermining an effectiveness of electronic mail communications.

2. The method of claim 1, wherein said identifying step comprises the step of identifying a network address for said source.

3. The method of claim 1, wherein said classifying step further comprises the step of classifying said source as an authenticated source only where an authenticated connection has been established with said source.

4. The method of claim 1, wherein said applying step comprises the step of limiting transfer of messages from a source classified as suspect.

5. The method of claim 1, wherein said applying step comprises the step of limiting transfer of messages from a source classified as anonymous.

6. A system for classifying electronic mail message transfer requests for policy enforcement comprising:
    a mail server;
    a memory comprising a set of mail transfer policies, each policy having an association with a corresponding source classification;
    at least one table of source identities having a particular classification; and,
    a classifier coupled to said mail server, said memory and said at least one table, the classifier identifying a source of an incoming electronic message included as part of a message transfer request in the mail server, classifying said source as one of a trusted source on condition that the source is located in a table of trusted sources, a suspect source where the source has an IP address that appears in a realtime black hole list on condition that the source is located in a table of suspect sources, a blocked source on condition that the source is present in a table of blocked sources, or an anonymous source on condition that the source is not present in any of the tables, subsequently selecting in the memory one of the mail transfer policies based upon the classification, the policies permitting full satisfaction of the request for a source classified as a trusted source, the policy prohibiting satisfaction of the request for a source classified as blocked and the policy permitting only limited satisfaction of the request for a source classified either as a suspect source or an anonymous source, and applying the selected one of the mail transfer policies to said incoming electronic message so as to curb transmission of spam without undermining an effectiveness of electronic mail communications.

7. A machine readable storage comprising a memory device having stored thereon a computer program for classifying electronic mail message transfer requests for policy enforcement, the computer program comprising a routine set of instructions which when executed by a machine cause the machine to perform the steps of:
    establishing a set of different message transfer policies, each policy having an association with a different classification of a source of an incoming electronic message;
    identifying a source of an incoming electronic message included as part of a message transfer request;
    classifying said source as one of a trusted source on condition that the source is located in a table of trusted sources, a suspect source where the source has an IP address that appears in a realtime black hole list on condition that the source is located in a table of suspect sources, a blocked source on condition that the source is present in a table of blocked sources, or an anonymous source on condition that the source is not present in any of the tables;
    subsequently selecting a message transfer policy from amongst the set based upon the classification, the policy permitting full satisfaction of the request for a source classified as a trusted source, the policy prohibiting satisfaction of the request for a source classified as blocked and the policy permitting only limited satisfaction of the request for a source classified either as a suspect source or an anonymous source; and,
    applying the selected message transfer policy to said incoming electronic message so as to curb transmission of spam without undermining an effectiveness of electronic mail communications.

8. The machine readable storage of claim 7, wherein said identifying step comprises the step of identifying a network address for said source.

9. The machine readable storage of claim 2, wherein said classifying step further comprises the step of classifying said source as an authenticated source only where an authenticated connection has been established with said source.

10. The machine readable storage of claim 2, wherein said applying step comprises the step of limiting transfer of messages from a source classified as suspect.

11. The machine readable storage of claim 2, wherein said applying step comprises the step of limiting transfer of messages from a source classified as anonymous.

* * * * *